United States Patent [19]

Ohnishi et al.

[11] Patent Number: 4,807,186

[45] Date of Patent: Feb. 21, 1989

[54] DATA TERMINAL WITH CAPABILITY OF CHECKING MEMORY STORAGE CAPACITY AS WELL AS PROGRAM EXECUTION PARAMETERS

[75] Inventors: Souichi Ohnishi, Yao; Tadahiro Toda, Nara; Kensaku Komai, Yamatokouriyama; Masuo Sugihara, Nara, all of Japan

[73] Assignee: Sharp Kabushiki Kaisha, Osaka, Japan

[21] Appl. No.: 214,826

[22] Filed: Jul. 5, 1988

Related U.S. Application Data

[63] Continuation of Ser. No. 784,606, Oct. 4, 1985, abandoned.

[30] Foreign Application Priority Data

Oct. 5, 1984 [JP] Japan .................................. 59-210267
Oct. 11, 1984 [JP] Japan ..................................... 213699

[51] Int. Cl.$^4$ ....................... G06F 11/32; G06F 11/00
[52] U.S. Cl. ...................................... 364/900; 371/21
[58] Field of Search ... 364/200 MS File, 900 MS File; 371/21

[56] References Cited

U.S. PATENT DOCUMENTS

| | | | |
|---|---|---|---|
| 4,191,996 | 3/1980 | Chesley | 364/200 |
| 4,334,307 | 6/1982 | Bourgeois et al. | 364/200 |
| 4,368,532 | 1/1983 | Imazeki et al. | 371/21 |
| 4,646,307 | 2/1987 | Nishimura | 371/53 |
| 4,648,066 | 3/1987 | Pitt | 364/900 |

Primary Examiner—Eddie P. Chan
Attorney, Agent, or Firm—Birch, Stewart, Kolasch & Birch

[57] ABSTRACT

A data input/output terminal includes a central processing unit, a random access memory (RAM), a display unit, and various data entry devices for inputting and outputting data to a host processor. The terminal includes the capability of setting program execution parameters which are necessary for the proper execution of various programs, and stores check sum codes of the parameters into an area of the RAM. Upon initial turn-on of power, the terminal determines the correct storage of the parameters in the RAM by re-calculating the check sum codes and comparing the re-calculated codes with the codes previously stored in the memory. The terminal also determines whether the RAM contains additional data storage capacity and indicates whether the RAM is capable of storing additional data or whether the RAM is full.

3 Claims, 7 Drawing Sheets

DATA TERMINAL WITH CAPABILITY OF CHECKING MEMORY STORAGE CAPACITY AS WELL AS PROGRAM EXECUTION PARAMETERS

This application is a continuation of application Ser. No. 784,606 filed on Oct. 4, 1985, now abandoned.

BACKGROUND OF THE INVENTION

1. Field of the Invention

The present invention relates to an electronic equipment such as a portable data output-input terminal driven by a battery means which can be effectively used to store data having been input by input means and to output a stored data to the host computer or other data I/O terminals.

2. Description of the Prior Art

A terminal equipment communicably connected to a host processor such as a host computer transfers input data to the host processor and accepts data output from the host processor. Upon using such a terminal equipment, it is necessary for the operator to know to what extent the memory is occupied by data and programs having been stored prior to the start of processing data.

If the empty area of the memory is not sufficient for processing data, various processes cannot be executed.

SUMMARY OF THE INVENTION

One of objects of the present invention is to provide an electronic data equipment being capable of checking the contents of a memory provided therein prior to the start of processing data without requiring any special operation.

Another object of the present invention is to provide a data output-input terminal equipment being capable of confirming automatically whether at least one application program has been stored correctly.

A further object of the present invention is to provide a data output-input terminal equipment being capable of checking whether application programs and parameters necessary therefor are stored correctly or whether they remain unchanged.

According to the present invention, there is provided an electronic equipment including a data entry means, a memory means for storing data, programs and so on, a processing unit for processing data according to programs stored in the memory means and a display means for displaying information indicated by the processing unit, characterized in that the memory means is backed up by a battery means so as to maintain stored contents even when the power supplied to the processing unit is turned off and that a memory check means is provided for checking the contents stored in the memory means to display at least one information about the contents of the memory means on the display when the power is turned back on.

According to the present invention, prior to the start of the execution of a program, the amount of memory area available for processing new data or for loading application programs is automatically displayed.

According to a preferred embodiment of the present invention, the memory check means can check whether application programs are stored as well as data necessary for executing programs.

According to another preferred embodiment of the present invention, the memory check means can check whether application programs and parameters therefor stored in the memory are kept unchanged.

BRIEF DESCRIPTION OF THE DRAWINGS

These and other objects and features of the present invention will become apparent from the following description in conjunction with the preferred embodiments thereof with reference to the accompanying drawings in which.

FIRST PREFERRED EMBODIMENT

Figure 1:
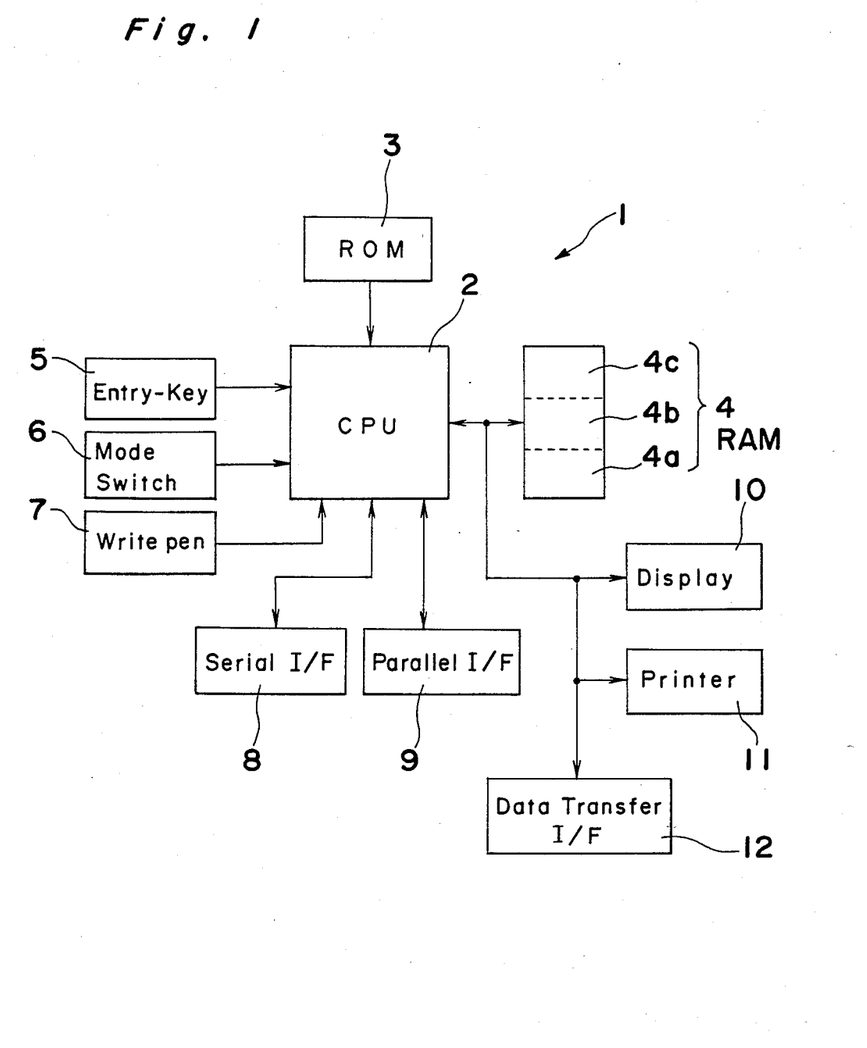
FIG. 1 is a block diagram showing the system of an electronic equipment according to the present invention.

FIG. 1 is a block diagram showing the composition of the electronic equipment 1 according to the present invention. The electronic equipment 1 is of comparatively small-size, and is connected to, for example, a host large-size processor through a telephone line, and used as a terminal to input data to the host processor.

The electronic equipment 1 includes CPU (Central Processing Unit) 2, for processing information data input thereinto and/or output therefrom, a ROM (Read Only Memory) 3 and a RAM (Random Access Memory) 4.

ROM 3 contains information required for IPL (Initial Program Loading) to initialize the system before processing data.

RAM 4 is a static random access memory which is able to maintain the contents stored therein even when power is turned off. RAM 4 may also be a dynamic random access memory constructed to maintain the contents stored therein even when power is turned off. RAM 4 has an area 4a in which input and output data are stored, an area 4b in which application programs are stored and an area 4c in which data necessary for executing the application programs are stored.

There is connected to CPU 1, a key entry means 5, a mode selector switch means 6, a write pen 7, an interface for serial data 8, an interface for parallel data 9, a display means 10, a printer 11, and an interface for transmitting data 12 respectively.

Data to be processed by CPU 2 may be entered with the key entry 5 and/or the write pen 7 which reads optical data such as bar codes printed on commodity labels as digital data and enters these digital data thereinto. Further, data can be input and/or output, via the interface for serial data 8, and/or the interface for parallel data 9 by other I/O (Input/Output) devices (not shown) and other processors connected via the interface for transmitting data 12.

The information input and/or output from the processor 2 is visually displayed by the display means 10, and also may be printed by the printer 11. The mode selector switch means 6 enables the operator to select in which mode the electronic equipment 1 should be operated.

Figure 2:
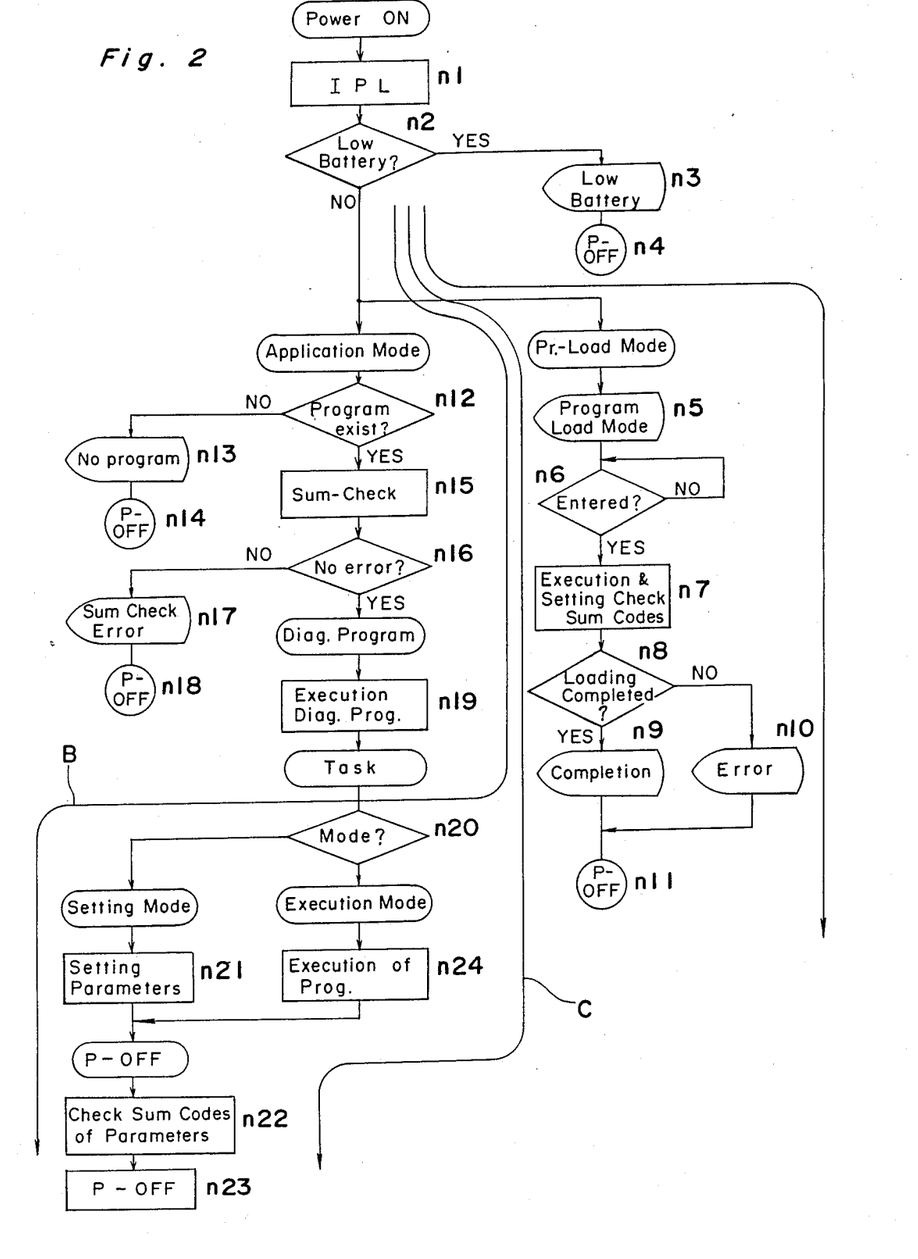
FIG. 2 is a flow chart showing the operation of the electronic equipment 1.

FIG. 2 is a flow chart showing the operation of the electronic equipment 1. When the operator first selects the program load mode with use of mode selector switch 6, the application program is loaded according to the flow indicated by arrow A.

When the operator turns the power supply for the processor 2 on, IPL is performed using the information stored in ROM 3 at step n1.

At step n2, it is decided whether the voltage of the power supply battery is lower than the predetermined voltage or not, and if it is so, a warning indicating a low battery is displayed on the display at step n3 and the power supply is turned off at step n4.

When the battery is normal, the display means 10 indicates the application program load mode at step n5.

At step n6, it is decided whether the key-in operation for executing the program loading is completed or not, and when the key-in operation is not completed within a predetermined time interval, the power is turned off. When the key-in operation is done, the application program is loaded into the area 4b of RAM 4 at step n7.

When the program loading is normally completed, the check sum code representing the content of the program is set in accordance with the present invention and the code is stored in the area 4c of RAM 4 at step n7.

At step n8, it is decided whether the program loading has been normally completed, and when it is normally completed, the display means 10 displays at step n9 that the program loading has been completed. When it is not normally completed, display means 10 indicates a program load error at step n10.

At step n11, the power is turned off and the loading of the application program into RAM 4 is finished.

When the operator activates the mode selector switch 6 to designate the mode for setting conditions for the application program and turns the power on, the process steps proceed along the flow indicated by arrow B.

First, steps n1 and n2 are performed and when the battery is normal, the process advances to step n12.

At step n12, it is decided whether an application program has been stored in RAM 4 or not. When the program has not been stored, the display means 10 indicates at step n13 that a program has not been loaded, and the power is turned off at step n14.

When a program is loaded, the process advances to step n15, and the sum check codes are calculated to check the contents of the program and conditions therefor and it is decided at step n16 whether the calculated sum check codes coincide with the sum check codes which have been set in the above-mentioned step n7 or not.

Step n16 performs the same operation as the above-mentioned step n8. If the sum check codes coincide, it is confirmed that the contents of the program remain unchanged from those having been loaded initially. If the sum check codes do not coincide, the process is advanced to step n17 and a display means 10 indicates the sum check error, and the power is turned off at step n18.

If the sum check codes coincide, the process advances to step n19 and a diagnostic routine for monitoring the program is performed to monitor the execution of the processing program and individual operational states of the whole processor 2. The application program is performed as a task under the monitor according to the monitoring program.

At step n20, it is decided whether the execution mode is designated by the mode selector switch 6. Since the mode for setting program conditions is designated at this stage, the process is advanced to step n21.

At step n21, conditions for the execution of the program are entered by the operator. After the execution conditions for the program are set, the process is advanced to step n22 and the check sum codes representing the contents of the execution conditions for the program are set and are stored in the area 4c of RAM 4. When the setting of execution conditions for the application program is completed, the process is advanced to step n23 and the power is turned off.

Next, when the operator designates the execution mode of the application program from the mode selector switch means 6 and turns the power on, the process advances according to the flow indicated by arrow C.

First, steps n1 and n2 are performed. When the battery is normal, steps n12 to n19 are performed as mentioned above.

At this time, at step n15, the sum check is performed to confirm the contents of the program and at the same time, the sum check for the execution conditions for the calculated program is performed. It is decided whether the sum check codes coincide with the sum check codes which have been set at step n22 or not.

If these two sum check codes coincide with each other, step n19 is executed and the process is advanced to step n20. Since the execution mode of the program is selected at this stage, the process is advanced to step n24 and the program is executed thereat. Then, steps n22 and n23 are executed as mentioned above.

Figure 3:
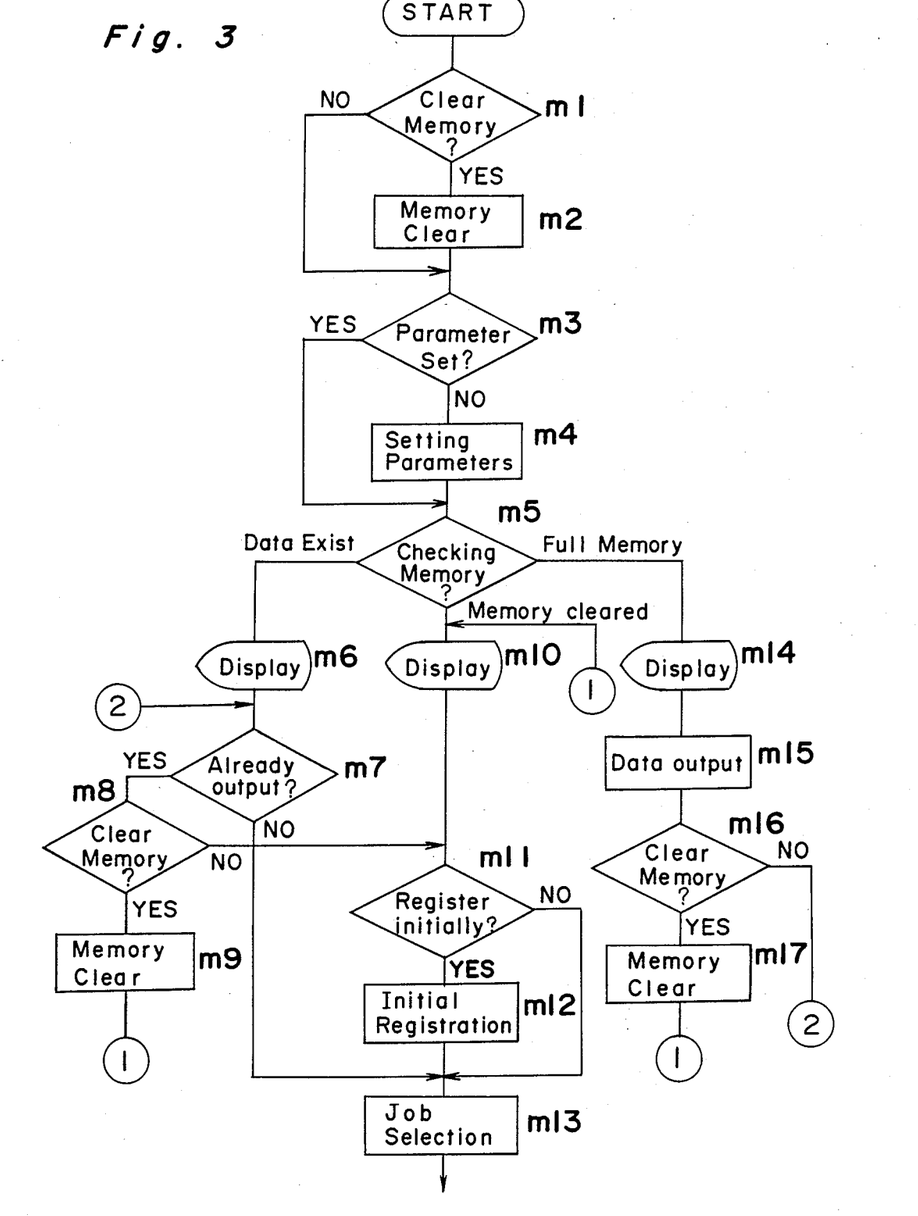
FIG. 3 is a flow chart to explain the operation of checking the contents of the memory according to the present invention.

FIG. 3 is a flow chart to explain the operation for checking the memory capacity for data storage in the area 4a in RAM 4 in accordance with the present invention.

When the execution mode for the application program is selected, it is decided at step m1 whether the data stored in the area 4a of RAM 4 should be cleared or not. If not, the process is advanced to step m3. When the data should be cleared, the process is advanced to step m2 and the memory is cleared.

At step m3, it is decided whether the execution conditions for the application program have been set or not. When the execution conditions have been set, the process is advanced to step m5. When the conditions have not been set, the process is advanced to step m4 and the execution conditions for the application program are set thereat.

At step m5, the amount of data stored in the memory area 4a is determined.

If not a full memory, namely if more data can be stored thereinto, the process is advanced to step m6 and the remaining memory capacity is displayed. At step m7, it is decided whether the stored data have been output or not. If the data have not been output yet, the process is advanced to step m13. If the data have been output already, the process is advanced to step m8 and it is decided whether the memory should be cleared or not. If the memory is to be cleared, the process is advanced to step m9 to clear the memory. When the memory is not to be cleared, the process is advanced to step m11. When the memory is cleared at step m9, the process is advanced to step m10 to display that the memory is cleared.

At step m11, it is decided whether the data are to be initially registered in the memory. When the data is not to be initially registered, the process is advanced to step m13 in order to select a job to be executed. If the data are to be registered, the process is advanced to step m12 for initial registration.

If the memory area 4a is in the full memory state at step m5, the process is advanced to step m14 to display the condition of a full memory state.

At step m15, the data are output, for example, to the host computer. Then the process is advanced to step m16 and it is decided whether the memory should be cleared or not. If the memory should not be cleared, the process is advanced to step m7. If the memory should be cleared, the process is advanced to step m17 and the memory is cleared thereat. When the memory has been cleared, the process is advanced to step m10 to display that the memory is cleared.

As mentioned above, according to the present invention, the electronic equipment is capable of checking whether the memory is full or not so that processing data are stored without requiring any special operations before processing various information.

SECOND PREFERRED EMBODIMENT

System Composition

Figure 4:
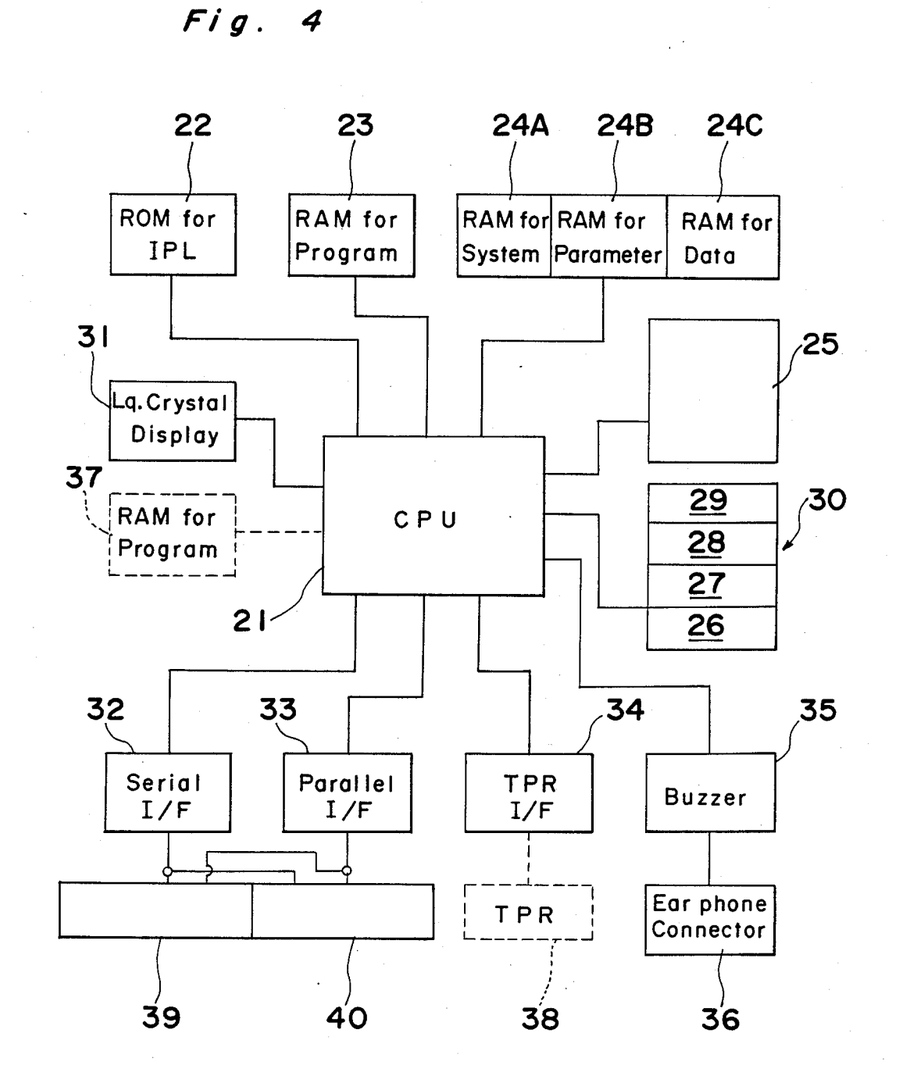
FIG. 4 is a diagram of a system of the data terminal equipment relating to another preferred embodiment of the present invention.
Figure 5:
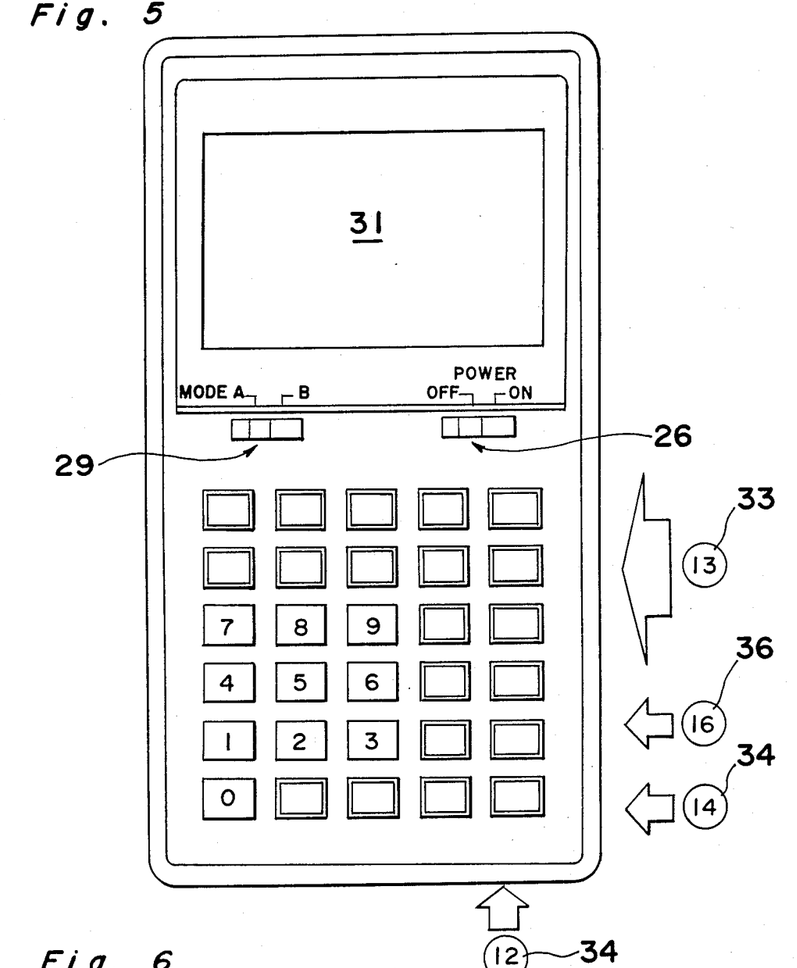
FIG. 5 is a front view of the data terminal.

FIG. 4 shows the system composition of a data I/O terminal equipment according to the present invention and FIG. 5 shows a front view of the terminal equipment.

As shown in FIG. 4, the present terminal equipment is equipped with the following:

Central processing unit 21 (hereinafter referred to as "CPU 21") consisting of a 1 chip microprocessor;

Read Only Memory 22 (hereinafter referred to as "ROM 22 for IPL") for the initial program loading;

Random Access Memory 23 for storing programs (hereinafter referred to as "RAM 23 for program");

Random Access Memories 24A, 24B and 24C for the system, for parameter data and for input data respectively;

Various function keys to be used for setting parameters for entry of data, etc.;

Keyboard 25 equipped with numerical-keys and function-keys;

Power switch 26;

Switch means 30 consisting of No. 1 and No. 2 system switches 27 and 28 and mode switch 29;

Liquid crystal display 31 to display various necessary data and/or messages;

Various interfaces (I/F), specifically, a serial I/F 32, a parallel I/F 33 and a I/F 34 for a bar code reader, a buzzer means 35 and an ear phone connector 36.

An additional RAM 37 for program storage and a bar code pen reader 38 (hereinafter referred to as "TPR 38") can be optionally provided.

CPU 21 is connected to the host machine (host computer) 39 or other data terminal equipment 40 via serial interface (I/F) 32 or parallel interface (I/F) 33.

As shown in FIG. 5, the keyboard 5 provides ten numerical-keys NK(i) (i=0 to 9) and 20 function keys FK(j) (j=1 to 20). The mode switch 29 is provided as a slide switch so as to select either mode A or mode B.

RAM 23 for program storage and RAM 24 for data storage are designed to be backed up by a built-in battery (not indicated in the diagram).

Figure 6:
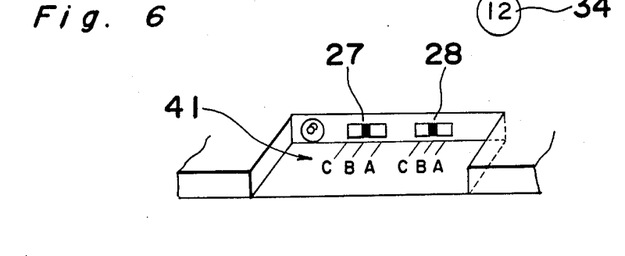
FIG. 6 is a perspective view showing system switches.

As shown in FIG. 6, No. 1 and No. 2 system switches 27 and 28 are mounted on a side wall defining a storage chamber 41 for the battery as switches which can select three positions A, B and C. These No. 1 and No. 2 system switches 27 and 28 are both selector switches used to specify various modes in combination with the said mode switch 29.

Operation Flow

Figure 7:
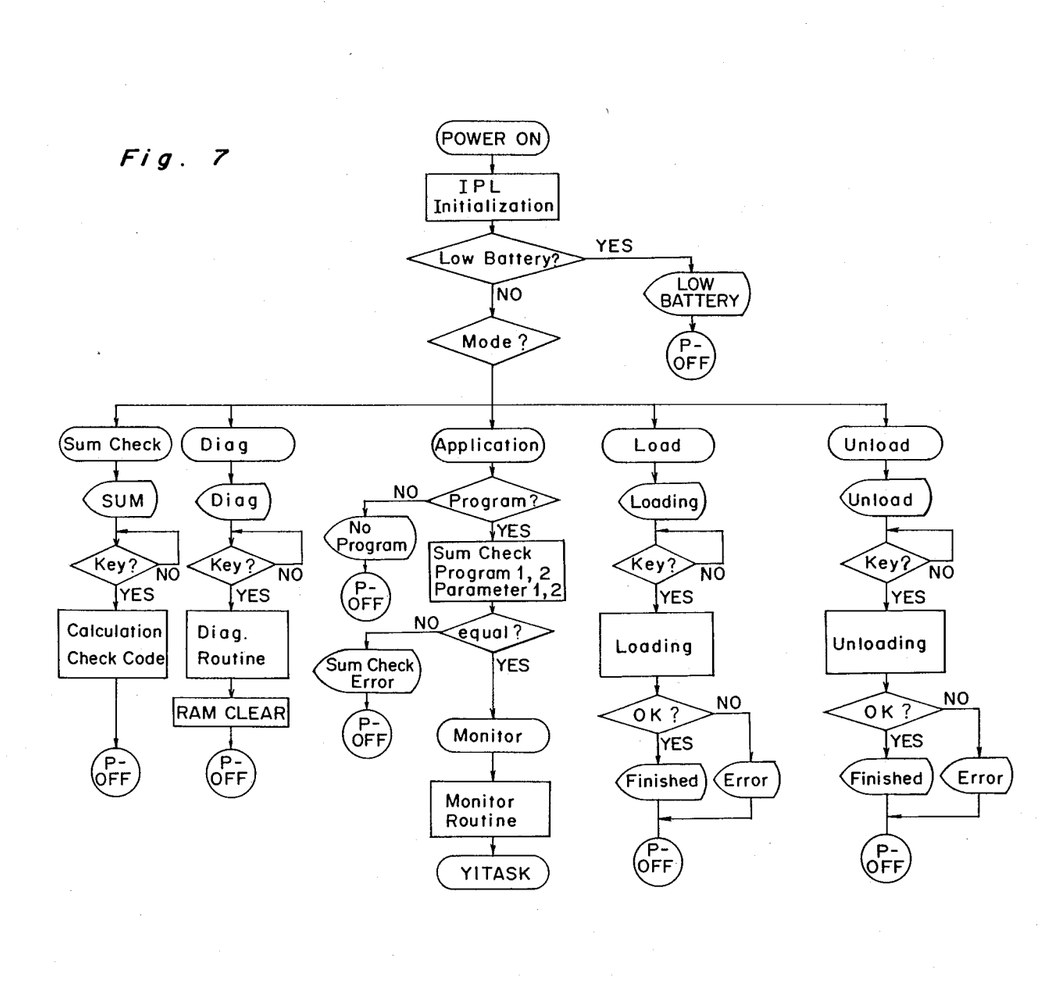
FIG. 7 is a flow chart showing a main routine program of the system.

FIG. 7 shows the operation flow to be performed by CPU 21. As shown in FIG. 7, when the power switch 26 is turned on, it is checked whether there are programs stored or not and whether each of the programs is normal or not in order to execute the program. Then, the battery is checked and if the battery is normal, a mode to be executed is selected.

The mode is designated by using No. 1 and No. 2 system switches 27 and 28 in combination with mode switch 29 as mentioned above. The following five modes can be designated in the present system.

(a) Sum Check Mode

Calculate check sum codes with respect to each program and parameters stored in RAMs 23, 24B respectively and set calculated check sum codes into a specified memory area.

(b) Diag Mode

Perform the diagnostic program stored in ROM area to check the hardware of the system such as ROM, RAM, the liquid crystal display, the keyboard and the buzzer.

(c) Application Mode

This is further subdivided into the mode for setting parameters and the execution mode.

(c)-1 Mode for Setting Parameters

A mode to set various job specifications suitable for jobs such as a data entry job (7 types at max.), data output job (1 type), master data entry job (1 type) and data collection job (1 type, optional) by setting parameters.

(c)-2 Execution Mode

A mode to execute a necessary job after performing each operation of initial setting, initial registration and job selection (either of data entry job section, data output job, etc.).

(d) Program Load Mode

A mode to load application programs and to set parameters with respect to application programs. This mode is further subdivided into a mode to load programs from the host machine and a mode to load programs from other data terminal equipment.

(e) Program Unload Mode

A mode to unload the programs and parameters (to output in order to transfer the contents to other terminal).

The table below shows how to designate a mode by operating system switches and the mode switch.

Figure 8:
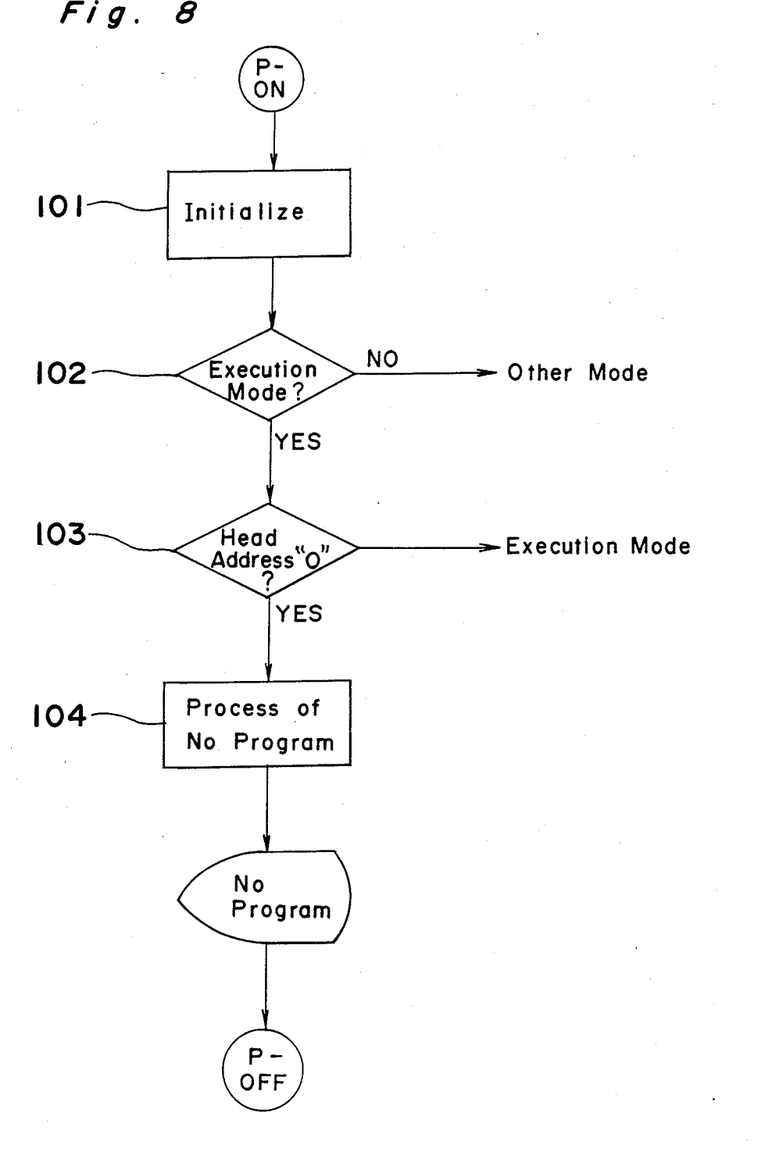
FIG. 8 is a flow chart showing the principal part of the initial program load system.

Operations executed by the IPL program will be described referring to FIG. 8.

When the power switch is turned on, the system is initialized at step 101. When the initialization is completed, it is decided at step 102 whether the mode designated by the means for setting modes is the application program execution mode or not.

If it is the execution mode, the specified area in RAM 24A for system is read in. The first address and final address of RAM 23 for the program in which the application program is loaded is to be stored in this area. If the application program is not loaded, this first address is "0, 0, 0, 0".

At step 103, it is decided whether the first address is "0, 0, 0, 0" or not. When the first address is not "0, 0, 0, 0", the process is advanced to the execution mode for the application program and starts execution. When the first address is "0, 0, 0, 0", this means that no application program has been loaded. Therefore, at step 104, it is displayed on the display that a program has not been loaded and forcibly turns the power off after a predetermined time has passed.

As mentioned above, according to the second embodiment of the present invention, the initial program stage checks whether the control of the system can be transferred for a stage to executing the application program or not.

Only when at least one application program is actually stored, the control is transferred from the initial program to the application program. When the application program has not been loaded, this condition is displayed on the display and the power is forcibly turned off. Therefore, the terminal equipment can be prevented from running away and also loading of the application programs can be urged.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

TABLE

| System SW. 1 | System SW. 2 | Mode SW. 3 | Mode | | | | |
|---|---|---|---|---|---|---|---|
| A | A | — | DIAG | | | | |
|   | B | — | UNDEFINE | | | | |
|   | C | A | LOAD FROM HOST | | | | |
|   |   | B | LOAD FROM OTHER TERMINAL | | | | |
| B | A | — | APPLICATION (Program mode) | | | | |
| C | A | — | APPLICATION (Execution mode) | | | | |
| B | B | A | o | x | x | | UNLOAD |
|   |   | B | x | x | x | | |
|   | C | A | o | o | x | | |
|   |   | B | x | o | x | | |
| C | B | A | o | x | o | | |
|   |   | B | x | x | o | | |
|   | C | A | o | o | o | | |
|   |   | B | x | o | o | | |
|   |   |   | DATA | PROGRAM 1 | DATA | PROGRAM 2 | |

Note: When unloading
o o: unloads
x: does not unload
o Program 1 is standard program.
o Program 2 is an optional program.
o Data are parameters.

What is claimed is:

1. A data input/output terminal, comprising:
random access memory (RAM) means for storing data including backup power supply means for maintaining the contents stored in said RAM means when main power to said terminal has been turned off;
data entry means for entering data including program execution parameters to be stored in said RAM means;
processor means for processing the data stored in said RAM means;
display means for displaying information related to the state of said terminals as well as processed data;
means for storing said program execution parameters in an area of said RAM means;
means for calculating check sum codes of said execution parameters and storing said codes in another areas of said RAM means;
means for determining the correct storage of said parameters in said RAM means by re-calculating said check sum codes and comparing said re-calculated codes with the codes stored in said RAM means and indicating via said display means whether said compared codes match;
means for determining whether said RAM means contains additional data storage capacity and indicating via said display means whether said RAM means is full or is capable of storing additional data; and
means for checking the existence of program instructions in said RAM means in an application mode and turning off power to said terminal if no program instructions exist.

2. The data input/output terminal defined in claim 1, wherein said data entry means includes a keyboard, a light pen, and data interface means for accepting and transmitting data to a host processor.

3. A data input/output terminal according to claim 1, in which the means for checking calculates check sum codes with respect to each program stored in said RAM means and compares whether check sum codes calculated coincide with those obtained upon loading the program into the RAM means.

* * * * *